US008761106B2

(12) United States Patent
Nakayama

(10) Patent No.: US 8,761,106 B2
(45) Date of Patent: Jun. 24, 2014

(54) RADIO BASE STATION AND COMMUNICATION CONTROL METHOD

(75) Inventor: Taku Nakayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 162 days.

(21) Appl. No.: 13/395,865

(22) PCT Filed: Sep. 14, 2010

(86) PCT No.: PCT/JP2010/065870
§ 371 (c)(1),
(2), (4) Date: Mar. 13, 2012

(87) PCT Pub. No.: WO2011/030909
PCT Pub. Date: Mar. 17, 2011

(65) Prior Publication Data
US 2012/0172077 A1 Jul. 5, 2012

(30) Foreign Application Priority Data

Sep. 14, 2009 (JP) ................................. 2009-211518

(51) Int. Cl.
H04W 72/04 (2009.01)
(52) U.S. Cl.
USPC ........................................................ 370/329
(58) Field of Classification Search
USPC ................................................ 370/329, 241
See application file for complete search history.

(56) References Cited

U.S. PATENT DOCUMENTS

| 8,165,085 | B2 * | 4/2012 | Nishio et al. | 370/329 |
| 8,411,635 | B2 * | 4/2013 | Nishio et al. | 370/329 |
| 8,526,376 | B2 * | 9/2013 | Nakao et al. | 370/329 |
| 2013/0044605 | A1 * | 2/2013 | Lee et al. | 370/241 |

FOREIGN PATENT DOCUMENTS

WO    WO 2009/057286    *    5/2009    ............. H04B 1/707

OTHER PUBLICATIONS

International Search Report; PCT/JP2010/065870; Dec. 28, 2010.
3GPP TSG RAN WG1 #52bis; NTT DoCoMo; PDCCH Allocation Based on Hashing Function Generation method for PDCCH Blind Decoding; Shenzhen, China Mar. 31, 2008 through Apr. 4, 2008.
3GPP TSG RAN WG1 Meeting #56; Nokia, Nokia Siemens Networks; PDCCH decoding complexity and associated hashing functions; Shenzhen, China, Mar. 31-Apr. 4, 2008.
3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release8); www.3gpp.org.
3GPP TS 36.213 V8.7.0 (May 2009); 3rd Generation Partnership Project; Technical Specification Group Radio Access Network; Evolved Universal Terrestrial Radio Access (E-UTRA); Physical layer procedures (Release 8); www.3gpp.org.
An Office Action; "Notice of Reason for Rejection," issued by the Japanese Patent Office on Sep. 10, 2013, which corresponds to Japanese Patent Application No. 2009-211518 and is related to U.S. Appl. No. 13/395,865; with Statement of Relevance.

* cited by examiner

Primary Examiner — Albert T Chou
(74) Attorney, Agent, or Firm — Studebaker & Brackett PC

(57) ABSTRACT

When allocating CCEs as a radio resource to a plurality of radio terminals within a predetermined sector, the disclosed radio base station (1) acquires an AL for each radio terminal within the predetermined sector, and sets a CCE allocating order for the radio terminals in descending order of corresponding AL size. Furthermore, the radio base station (1) allocates CCEs to predetermined radio terminals to be allocated to in accordance with the set allocating order.

4 Claims, 4 Drawing Sheets

FIG. 3

RADIO BASE STATION AND COMMUNICATION CONTROL METHOD

TECHNICAL FIELD

The present invention relates to a radio base station that forms a predetermined cell or sector and allocates a radio resource corresponding to the predetermined cell or sector to a plurality of radio terminals, and a communication control method of the radio base station.

BACKGROUND ART

In recent years, in response to implementation of broadband to mobile communication services, there is an increasing demand for high speed and large capacity. In this regard, a 3rd-generation mobile communication system represented by W-CDMA (Wideband Code Division Multiple Access) or the next-generation mobile communication system, which is an alternative to a 3.5th-generation mobile communication system, has been commercialized all over the world. Also in Japan, frequency allocating for a 3.9th-generation mobile communication system positioned as a mobile communication system leading to a 4th-generation mobile communication system, has begun. In the 3.9th-generation mobile communication system, LTE (Long Term Evolution) is the most powerful candidate for a standard leading to the 4th-generation mobile communication system.

In the LTE, OFDMA (Orthogonal Frequency Division Multiplexing Access) is adopted for downlink communication toward a radio terminal from a radio base station, and SC-FDMA (Single Carrier Frequency Division Multiple Access) is adopted for uplink communication toward the radio base station from the radio terminal. In these multiplexing methods, user multiplexing is achieved by arranging a radio resource in the two dimensions of frequency and time.

A frequency band, which is a downlink radio resource, is divided in units of a resource block (RB). The RB includes a control information channel (PDCCH: Physical Downlink Control CHannel), which is a time slot as a radio channel for downlink control information transmission, and a shared data channel (PDSCH: Physical Downlink Shared CHannel) which is a time slot as a radio channel for downlink user data transmission.

In the LTE, when a radio base station allocates CCE (Control Channel Element: a radio resource for a radio terminal) to each radio terminal, the radio base station sets an aggregation level (AL), which indicates the number of continuous CCEs to be ensured, with respect to the PDCCH for control information transmission. Thus, it is possible to perform allocating control corresponding to a radio state between the radio terminal and the radio base station.

In this case, in a CCE allocating position for transmitting control information toward the radio terminal, a certain level of allocating position is limited in advance as a search space for each radio terminal.

The search space is set to be different between radio terminals to the extent possible based on RNTI (Radio Network Temporary Id), which indicates unique information of a radio terminal, the number of subframes, and AL corresponding to the radio terminal (for example, see Non-Patent Documents 1 and 2).

PRIOR ART DOCUMENT

Non-Patent Document

Non-Patent Document 1: 3GPP TS 36.213 V8.7.0 "Technical Specification Group Radio Access Network; Evolved Universal Terrestrial Radio Access (E-UTRA); Physical layer procedures (Release 8)"

Non-Patent Document 2: 3GPP TS 36.211 V8.7.0 "Technical Specification Group Radio Access Network; Evolved Universal Terrestrial Radio Access (E-UTRA); Physical Channels and Modulation (Release 8)"

SUMMARY OF THE INVENTION

A radio base station allocates CCE to each radio terminal based on a predetermined reference, and notifies each radio terminal of a CCE allocating result through control information. At this time, when continuous CCEs in a search space determined by AL corresponding to a radio terminal have already been allocated to other radio terminals, the radio base station has to give up intended allocation, resulting in the reduction in the use efficiency of a radio resource.

Specifically, AL corresponding to a radio terminal with a bad radio condition with respect to a radio base station may be increased in many cases. However, it is difficult for such a radio terminal to ensure continuous CCEs corresponding to AL, so that a radio condition corresponding to the radio terminal may be further deteriorated.

Therefore, an object of the present invention is to provide a radio base station and a communication control method, capable of efficiently allocating a radio resource.

To solve the above problem, the present invention has following features. A first feature of the present invention is summarized as a radio base station (radio base station 1) that forms a predetermined cell or sector and allocates a radio resource corresponding to the predetermined cell or sector to a plurality of radio terminals (radio terminal 2A, 2B), the radio base station comprising: a continuous radio resource number acquisition unit (AL acquisition unit 160) configured to acquire a number of continuous radio resources determined by a radio state between the respective radio terminals and the radio base station, for each radio terminal; an allocating order setting unit (allocating order setting unit 162) configured to set a radio resource allocating order for the plurality of radio terminals in a descending order of the number of corresponding continuous radio resources; and an allocating unit (CCE allocating unit 166) configured to allocate the radio resource to a predetermined radio terminal which is a target terminal for allocating, according to the allocating order.

It is more difficult to allocate radio resources to a radio terminal having a larger number of continuous radio resources. Thus, a radio resource allocating order is set for a plurality of radio terminals in a descending order of the number of continuous radio resources and a radio resource is allocated according to the allocating order, thereby increasing the probability that a radio resource is allocated to a radio terminal with the large number of continuous radio resources. As a consequence, it is possible to prevent a radio resource from being difficult to be endured and to efficiently allocate a radio resource.

A second feature of the present invention is summarized as that the allocating unit allocates the radio resource in a search region where all radio resources are not used, to the predetermined radio terminal which is the target terminal for allocating, among search regions of radio resources determined in advance for the predetermined radio terminal.

A third feature of the present invention is summarized as that the radio resource is used to transmit control information.

A fourth feature of the present invention is summarized as a communication control method of a radio base station that forms a predetermined cell or sector and allocates a radio resource corresponding to the predetermined cell or sector to a plurality of radio terminals, the communication control method comprising: a step in which the radio base station acquires a number of continuous radio resources determined by a radio state between the respective radio terminals and the radio base station, for each radio terminal; a step in which the radio base station sets a radio resource allocating order for the plurality of radio terminals in a descending order of the number of corresponding continuous radio resources; and a step in which the radio base station allocates the radio resource to a predetermined radio terminal, which is a target terminal for allocating, according to the allocating order.

According to the present invention, it is possible to efficiently allocate a radio resource.

BRIEF DESCRIPTION OF THE DRAWINGS

FIG. 3 is a diagram illustrating an example of allocation of CCE according to the embodiment of the present invention.

MODES FOR CARRYING OUT THE INVENTION

Figure 1:
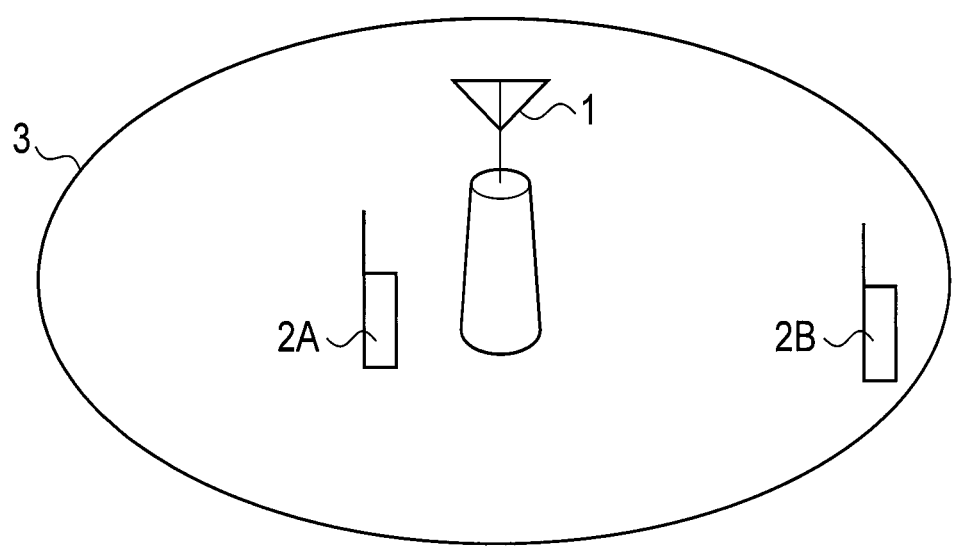
FIG. 1 is an entire schematic configuration diagram of a radio communication system according to an embodiment of the present invention.

Next, an embodiment of the present invention will be described with reference to the drawings. Specifically, (1) Configuration of Radio Communication System, (2) Operation of Radio Base Station, (3) Operation and Effect, and (4) Other Embodiments will be described. It is to be noted that the same or similar reference numerals are applied to the same or similar parts through the drawings in the following embodiments.
(1) Configuration of Radio Communication System
(1. 1) Entire Schematic Configuration of Radio Communication System FIG. 1 is an entire schematic configuration diagram of a radio communication system 10 according to an embodiment of the present invention.

The radio communication system 10 illustrated in FIG. 1 has a configuration based on LTE (Long Term Evolution) which is a standard designed in a 3GPP. The radio communication system 10 includes a radio base station 1 and radio terminals 2A and 2B.

Figure 2:
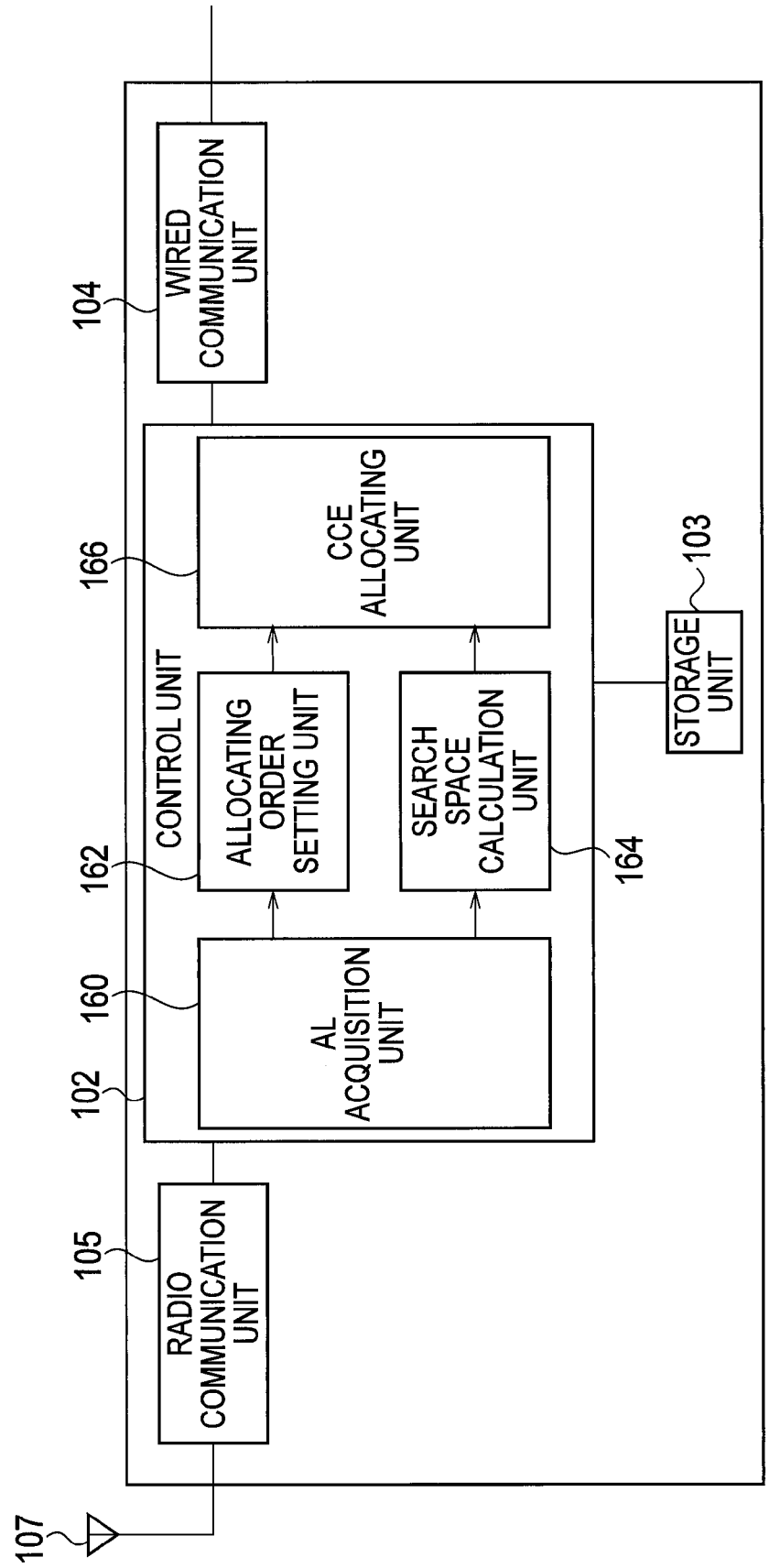
FIG. 2 is a configuration diagram of a radio base station according to the embodiment of the present invention.

In FIG. 1, a cell 3 is divided into a plurality of sectors (not illustrated). In FIG. 1, the radio terminals 2A and 2B exist in one sector (a predetermined sector). The radio base station 1 performs communication between the radio terminals 2A and 2B existing in the cell 3.
(1. 2) Configuration of Radio Base Station FIG. 2 is a diagram illustrating the configuration of the radio base station 1A. The radio base station 1A illustrated in FIG. 2 includes a control unit 102, a storage unit 103, a wired communication unit 104, a radio communication unit 105, and an antenna 107.

The control unit 102, for example, includes a CPU and controls various functions of the radio base station 1A. The storage unit 103, for example, includes a memory and stores various types of information used for control and the like of the radio base station 1. The wired communication unit 104 is connected to a backbone network (not illustrated) through a router and the like (not illustrated). The radio communication unit 105 receives a radio signal from the radio terminals 2A and 2B, and transmits a radio signal to the radio terminals 2A and 2B through the antenna 107.

Next, detailed control of the control unit 102 will be described. The control unit 102 allocates CCE (Control Channel Element), which constitutes a resource block (RB) being a downlink radio resource, to the radio terminals 2A and 2B, which are radio terminals in one sector constituting the cell 3 formed by the radio base station 1, according to channel quality required by the radio terminals 2A and 2B.

The RB includes two types of radio channels, specifically, a control information channel (PDCCH) and a shared data channel (PDSCH). A region of the PDCCH reaches from the head of the RB to three OFDM symbols at maximum, and includes a plurality of CCEs. A region of the PDSCH is OFDM symbols following the PDCCH.

Channel quality required by radio terminals in a predetermined sector differs. The control unit 102 sets the number of CCEs to be allocated and allocates the resultant CCEs to radio terminals according to the channel quality required by the radio terminals.

Furthermore, the control unit 102 sets a modulation method, a coding rate, the number of retransmissions, and a communication scheme such as MIMO (Multiple-Input Multiple-Output) according to the channel quality required by the radio terminals in the predetermined sector.

The PDCCH includes various types of information required for receiving user data included in the PDSCH. Accordingly, when it is not possible to receive the information included in the PDCCH, it is not possible for a radio terminal to receive the user data included in the PDSCH. In this regard, the PDCCH is a very important radio channel.

In the allocating of CCE in the PDCCH, the number of continuous CCEs to be ensured is called an aggregation level (AL).

The control unit 102 determines the AL such that the quality of the PDCCH satisfies SINR (Signal to Interference and Noise Ratio) corresponding to the AL for each radio terminal in the predetermined sector, so that a coding rate can be adjusted through repetition and characteristic improvement can be achieved.

As illustrated in FIG. 2, the control unit 102 includes an AL acquisition unit 160, an allocating order setting unit 162, a search space calculation unit 164, and a CCE allocating unit 166.

For each radio terminal in a predetermined sector, the AL acquisition unit 160 estimates the quality (SINR) of the PDCCH corresponding to the radio terminal.

For example, the radio terminal in the predetermined sector measures W-CQI corresponding to the average quality of the PDSCH included in a predetermined downlink radio resource. Furthermore, the radio terminal in the predetermined sector transmits the measured W-CQI toward the radio base station 1. The AL acquisition unit 160 in the control unit 102 of the radio base station 1 receives the W-CQI from the radio terminal through the antenna 107 and the radio communication unit 105. Next, the AL acquisition unit 160 converts the W-CQI, which is received from the radio terminal, to SINR, and uses the SINR as SINR of the PDCCH corresponding to the radio terminal. In addition, the AL acquisition unit 160 may also estimate the SINR of the PDCCH corresponding to the radio terminal by using other techniques.

In this way, after estimating the SINR of the PDCCH corresponding to each radio terminal in the predetermined sector, the AL acquisition unit 160 determines AL for each radio terminal in the predetermined sector such that the AL becomes lower as the SINR of the PDCCH is higher. In addition, the AL acquisition unit 160 associates the determined AL with identification information of the radio terminal corresponding to the AL. The identification information of the radio terminal, for example, is included in a radio signal from the radio terminal.

The allocating order setting unit 162 sets a CCE allocating order for the radio terminal in the predetermined sector in a descending order of ALs corresponding to the radio terminal. Information on the allocating order is associated with identification information of a corresponding radio terminal and is stored in the storage unit 103. In addition, when a plurality of radio terminals with the same AL exist, the allocating order setting unit 162 sets different allocating orders for the plurality of radio terminals with the same AL.

The search space calculation unit 164 calculates a search space for each radio terminal in the predetermined sector.

Specifically, the search space calculation unit 164 acquires the RNTI of the radio terminal in the predetermined sector, the number of subframes, and the total number of CCEs. The RNTI of the radio terminal is included in the radio signal from the radio terminal. Furthermore, the number of subframes and the total number of CCEs, for example, are stored in the storage unit 103 in advance.

Next, for each radio terminal in the predetermined sector, the search space calculation unit 164 calculates a search space corresponding to a pseudo random sequence generated using the RNTI of the radio terminal, the number of subframes, and the total number of CCEs. In the case of FIG. 1, searches spaces are calculated for the radio terminals 2A and 2B.

For example, when the AL is 8 and the total number of CCEs is 39, search spaces are CCE 0 to CCE 7, CCE 8 to CCE 15, CCE 16 to CCE 23, and CCE 24 to CCE 31.

The CCE allocating unit 166 allocates CCE to each radio terminal in the predetermined sector.

Specifically, the CCE allocating unit 166 selects a radio terminal (a self-radio terminal) with the highest CCE allocating order from radio terminals in the predetermined sector, where CCEs are not allocated.

Next, the CCE allocating unit 166 determines the presence or absence of a self-search space, where all the CCEs are not used, among search spaces (self-search spaces) corresponding to the self-radio terminal.

When there exist the self-search spaces where all the CCEs are not used, the CCE allocating unit 166 allocates CCEs in the self-search spaces, where all the CCEs are not used, to the self-radio terminal.

Figure 3:
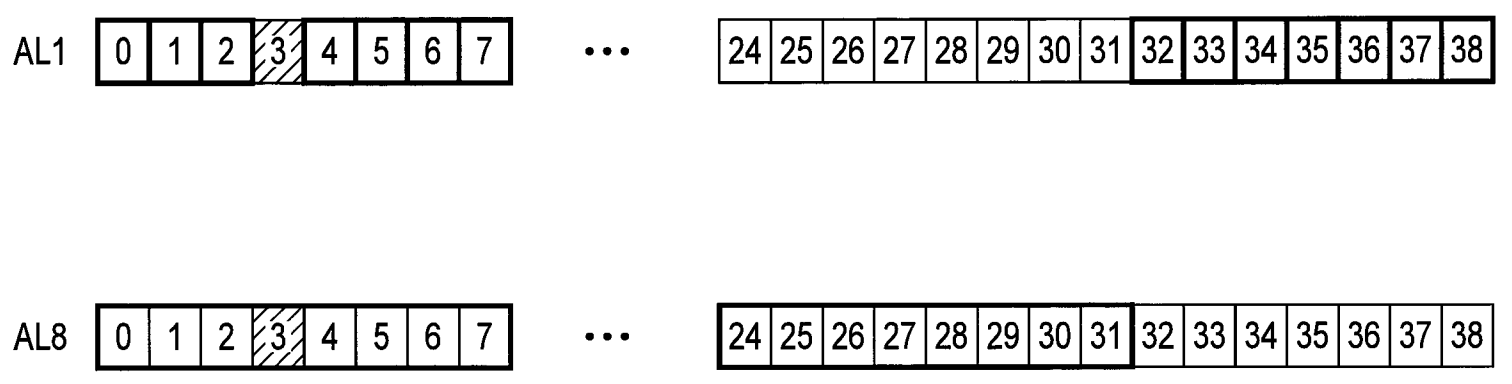

FIG. 3 is a diagram illustrating a CCE allocating example. FIG. 3 illustrates an example of allocating of CCE when there exist a radio terminal of which the AL is 1 and a radio terminal of which the AL is 8.

In the example of FIG. 3, first, the CCE allocating unit 166 allocates CCEs to a radio terminal of which the AL is 8, which means a high CCE allocating order. Here, among search spaces of CCE 0 to CCE 7, CCE 8 to CCE 15, CCE 16 to CCE 23, and CCE 24 to CCE 31, CCE 3 has already been used in the search spaces of CCE 0 to CCE 7. Thus, the CCE allocating unit 166 allocates CCEs (here, 8 CCEs in the search spaces of CCE 24 to CCE 31) in any one of the search spaces of CCE 8 to CCE 15, CCE 16 to CCE 23, and CCE 24 to CCE 31, where all the CCEs are not used, to the radio terminal with the AL of 8.

Next, the CCE allocating unit 166 allocates CCEs to a radio terminal of which the AL is 1, which means a low CCE allocating order. Here, among search spaces each including one of CCE 0 to CCE 38, CCE has already been used in the search spaces each including CCE 3 or one of CCE 24 to CCE 31. Thus, the CCE allocating unit 166 allocates CCE in any one of the search spaces each including one of CCE 0 to CCE 2, one of CCE 4 to CCE 23, or one of CCE 32 to CCE 38, where all the CCEs are not used, to the radio terminal with the AL of 1.

Then, the control unit 102 transmits information on the CCE allocated by the CCE allocating unit 166, for example, information capable of uniquely specifying CCE, to the radio terminals 2A and 2B, which are radio terminals in the predetermined sector, through the radio communication unit 105 and the antenna 107.

Thereafter, the control unit 102 transmits allocating information of an uplink shared data channel (PUSCH: Physical Uplink Shared CHannel) in the upstream direction, and control information including a transmission power control command to the radio terminals 2A and 2B through the radio communication unit 105 and the antenna 107 by using the CCEs allocated to the radio terminals 2A and 2B.

When the control information transmitted using the PDCCH is normally received, the radio terminals 2A and 2B perform various types of control based on the control information. Specifically, the radio terminals 2A and 2B receive the user data transmitted using the allocated PDSCH, and transmit the user data using the allocated PUSCH. Furthermore, the radio terminals 2A and 2B control transmission power according to the transmission power control command. Then, if the user data transmitted using the PDSCH is received, the radio terminals 2A and 2B transmit an ACK or a NACK as a response to the radio base station 1A by using the PUSCH.

(2) Operation of Radio Base Station

Figure 4:
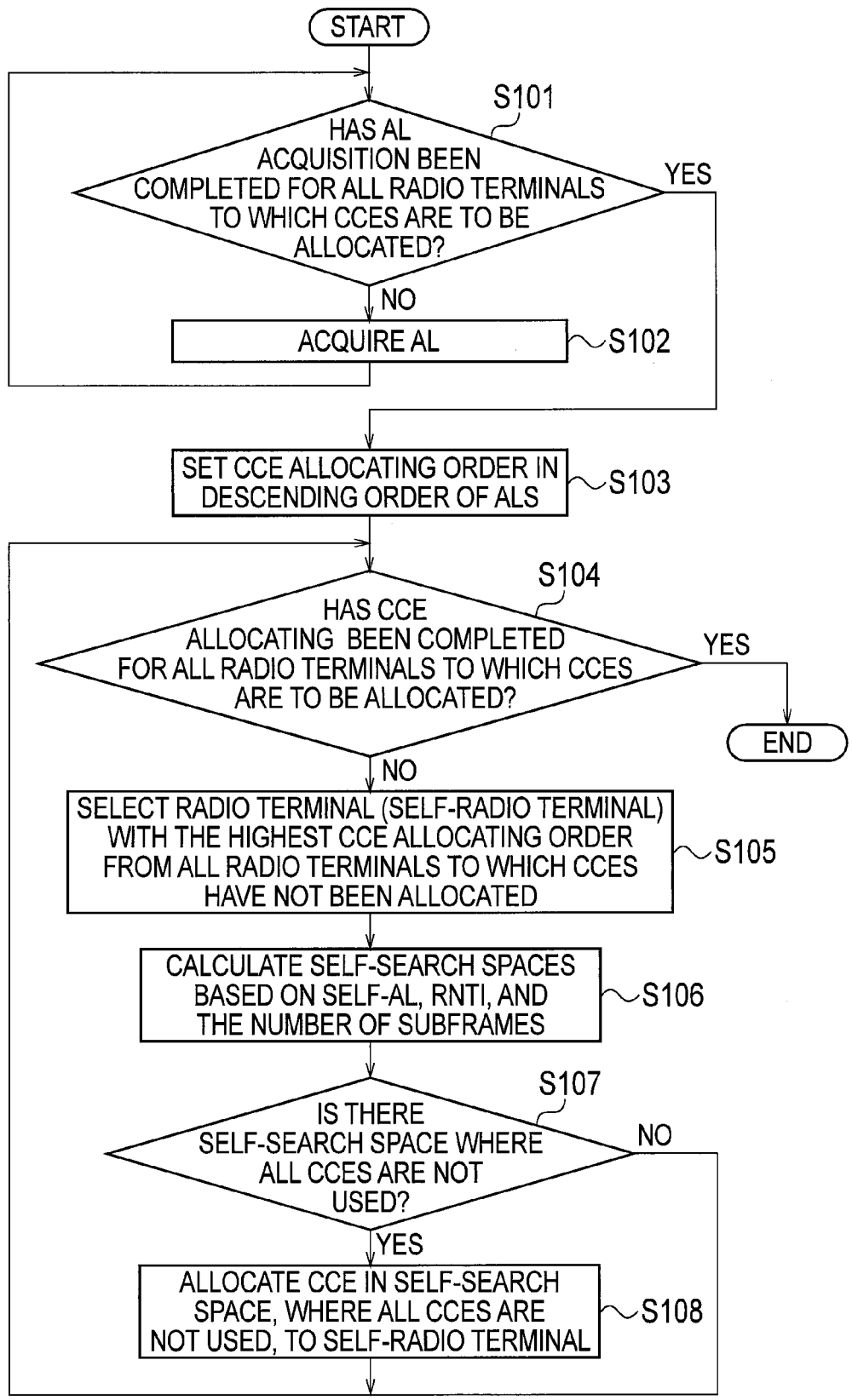
FIG. 4 is a flowchart illustrating a CCE allocation operation of the radio base station according to the embodiment of the present invention.

FIG. 4 is a flowchart illustrating a CCE allocating operation of the radio base station 1. In addition, it is assumed that in an initial state, CCEs are not allocated to all radio terminals in a predetermined sector.

In step S101, the control unit 102 determines whether AL acquisition has been completed for all radio terminals to which CCEs are to be allocated.

When the AL acquisition has not been completed for all the radio terminals to which CCEs are to be allocated, the control unit 102 acquires ALs of the radio terminals for which the AL acquisition has not been completed.

Meanwhile, when the AL acquisition has been completed for all the radio terminals to which CCEs are to be allocated, the control unit 102 sets a CCE allocating order for all the radio terminals, to which CCEs are to be allocated, in a descending order of ALs corresponding to the radio terminals in step S103.

In step S104, the control unit 102 determines whether CCE allocating has been completed for all the radio terminals to which CCEs are to be allocated. In addition, when negative determination has been made in step S107 which will be described later, a radio terminal, to which CCE has not been allocated, is regarded as a radio terminal for which the CCE allocating has been completed, in step S104.

When the CCE allocating has been completed for all the radio terminals to which CCEs are to be allocated, a series of operations are ended.

Meanwhile, when the CCE allocating has not been completed for all the radio terminals to which CCEs are to be allocated, the control unit 102 selects a corresponding radio terminal (a self-radio terminal) with the highest CCE allocating order from radio terminals to which CCEs have not been allocated, in step S105.

In step S106, the control unit 102 calculates search spaces (self-search spaces) corresponding to the self-radio terminal based on AL (a self-AL) corresponding to the self-radio terminal, RNTI of the self-radio terminal, and the number of subframes.

In step S107, the control unit 102 determines the presence or absence of self-search spaces, where all CCEs are not used, among the calculated self-search spaces. When there exist no self-search spaces where all the CCEs are not used, CCE is not allocated to the self-radio terminal. In this case, the operations after step S104 are repeated.

Meanwhile, when there exist the self-search spaces where all CCEs are not used, the control unit 102 allocates CCE in the self-search space, where all CCEs are not used, to the self-radio terminal in step S108. Then, the operations after step S105 are repeated.

(3) Operation and Effect

In the present embodiment, when allocating CCE as a radio resource to a plurality of radio terminals in a predetermined sector, the radio base station 1 acquires AL of each radio terminal in the predetermined sector, and sets a CCE allocating order for the radio terminals in a descending order of a corresponding AL. In addition, the radio base station 1 allocates CCE to a predetermined radio terminal, to which CCE is to be allocated, according to the set CCE allocating order.

As a radio terminal has a high AL, in other words, as the number of continuous unused CCEs to be ensured is large, it is difficult to allocate CCE to the radio terminal. Consequently, the radio base station 1 sets a CCE allocating order for a plurality of radio terminals in a descending order of AL and allocates a radio resource according to the allocating order, thereby increasing the probability that CCE is allocated to a radio terminal with a high AL. As a consequence, it is possible to prevent a radio resource from being difficult to be ensured and efficiently allocate a radio resource.

(4) Other Embodiments

While the present invention has been described by way of the foregoing embodiment, it should not be understood that those descriptions and drawings constituting a part of the present disclosure limit the present invention. Further, various substitutions, examples or operational techniques shall be apparent to a person skilled in the art based on this disclosure.

In the above-mentioned embodiment, the search space is set. However, even when the search space is not set, the present invention can be applied in the same manner. In this case, when allocating CCE to a radio terminal, it is sufficient if the CCE allocating unit 166 of the control unit 102 of the radio base station 1 allocates an unused CCE.

Furthermore, in the above-mentioned embodiment, CCE is allocated to the radio terminal in the predetermined sector. However, in the case in which a cell has not been divided into sectors, even when allocating CCE to a radio terminal in the cell, the present invention can be applied in the same manner.

Thus, it must be understood that the present invention includes various embodiments that are not described herein. Therefore, the present invention is limited only by the specific features of the invention in the scope of the claims reasonably evident from the disclosure above.

The entire contents of Japanese Patent Application No. 2009-211518 (filed on Sep. 14, 2009) are incorporated in the present specification by reference.

INDUSTRIAL APPLICABILITY

The radio base station and the communication control method of the present invention can efficiently allocate a radio resource, and are available as a radio base station and a communication control method.

The invention claimed is:

1. A radio base station that forms a predetermined cell or sector and allocates a radio resource corresponding to the predetermined cell or sector to a plurality of radio terminals, the radio base station comprising:
   a continuous radio resource number acquisition unit configured to acquire a number of continuous radio resources determined by a radio state between the respective radio terminals and the radio base station, for each radio terminal;
   an allocating order setting unit configured to set a radio resource allocating order for the plurality of radio terminals in a descending order of the number of corresponding continuous radio resources; and
   an allocating unit configured to allocate the radio resource to a predetermined radio terminal which is a target terminal for allocating, according to the allocating order, wherein
   the allocating order setting unit sets different allocating orders for two or more radio terminals when the number of continuous radio resources corresponding to each of the two or more radio terminals is the same number.

2. The radio base station according to claim 1, wherein the allocating unit allocates the radio resource in a search region where all radio resources are not used, to the predetermined radio terminal which is the target terminal for allocating, among search regions of radio resources determined in advance for the predetermined radio terminal.

3. The radio base station according to claim 1 or 2, wherein the radio resource is used to transmit control information.

4. A communication control method of a radio base station that forms a predetermined cell or sector and allocates a radio resource corresponding to the predetermined cell or sector to a plurality of radio terminals, the communication control method comprising:
   a step in which the radio base station acquires a number of continuous radio resources determined by a radio state between the respective radio terminals and the radio base station, for each radio terminal;
   a step in which the radio base station sets a radio resource allocating order for the plurality of radio terminals in a descending order of the number of corresponding continuous radio resources; and
   a step in which the radio base station allocates the radio resource to a predetermined radio terminal, which is a target terminal for allocating, according to the allocating order, wherein
   with setting the radio resource allocating order, different allocating orders are set for two or more radio terminals when the number of continuous radio resources corresponding to each of the two or more radio terminals is the same number.

* * * * *